US006778328B1

(12) United States Patent
Aizenberg et al.

(10) Patent No.: US 6,778,328 B1
(45) Date of Patent: Aug. 17, 2004

(54) TUNABLE FIELD OF VIEW LIQUID MICROLENS

(75) Inventors: Joanna Aizenberg, New Providence, NJ (US); Timofei Nikita Kroupenkine, Warren, NJ (US); Stanley Pau, Hoboken, NJ (US); Shu Yang, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/402,046

(22) Filed: Mar. 28, 2003

(51) Int. Cl.[7] .......................... G02B 3/12; G02B 27/10; G02B 6/26
(52) U.S. Cl. .......................... 359/665; 359/620; 385/41
(58) Field of Search .................. 359/655, 666, 359/642, 796, 620, 245, 254, 625, 626; 385/33, 35, 39–41

(56) References Cited

U.S. PATENT DOCUMENTS 6,369,954 B1 * 4/2002 Berge et al. ................ 359/666
6,538,823 B2 * 3/2003 Kroupenkine et al. ...... 359/665
6,665,127 B2 * 12/2003 Bao et al. ................... 359/665

* cited by examiner

*Primary Examiner*—Georgia Epps
*Assistant Examiner*—William Choi
(74) *Attorney, Agent, or Firm*—David W. Herring

(57) ABSTRACT

A tunable microlens is disclosed that having a substrate with a non-zero radius of curvature in a way such that the microlens is able to achieve a new directional view without manual repositioning. The directional view of the microlens is altered by applying a voltage to at least one of a plurality of electrodes and thereby causing a voltage differential between the at least one of a plurality of electrodes and a conducting droplet of liquid disposed on the substrate with a non-zero radius of curvature. As the droplet moves to a different point along the surface of the substrate having a non-zero radius of curvature, the directional view the microlens changes in a way such that light originating from the new directional view is more advantageously focused into an image on a detector. The field of view of the microlens is limited only by the area on the substrate over which the droplet can move. An array of such microlenses may be used to facilitate a wider field of view.

15 Claims, 6 Drawing Sheets

TUNABLE FIELD OF VIEW LIQUID MICROLENS

FIELD OF THE INVENTION

The present invention relates to microlenses, and more particularly, to liquid microlenses.

BACKGROUND OF THE INVENTION

Optical components are widely used in many optoelectronic applications that require light to be focused onto a specific point. Such applications include optical telecommunications applications and applications that simulate the function of the human eye. Traditionally in such applications, manual positioning and tuning of a lens and its surrounding support structure is required to maintain focus of the image onto a detector and to receive light beams originating from different angular directions relative to the lens. However, devices that rely on such manual positioning can be slow and quite expensive.

In one attempt to eliminate this manual tuning, small tunable lenses (also known as tunable microlenses) were developed to achieve optimal optical coupling between an optical source and an optical signal receiver, such as a photodetector. The microlens acts to focus the optical signal onto its intended destination (e.g., the photodetector). In some cases the refraction index of these microlenses is automatically varied in order to change the focus characteristics of the microlens when the incidence of a light beam upon the microlens varies from its nominal, aligned incidence. Thus, the desired coupling is maintained between the microlens and the photodetector. Therefore, the manual positioning and adjustment required in previous systems is eliminated.

Most tunable microlenses are either gradient index (GRIN) lenses with the refractive index controlled electrostatically or flexible polymeric lenses with the shape (and, therefore, the focal length) controlled mechanically. Both technologies have inherent limitations that impose severe restrictions on the performance of these existing tunable microlenses.

Tunable gradient index lenses have inherent limitations associated with the relatively small electro-optic coefficients found in the majority of electro-optic materials. This results in a small optical path modulation and, therefore, requires thick lenses or very high voltages to be employed. In addition, many electro-optic materials show strong birefringence that causes polarization dependence of the microlens, which distorts light with certain polarizations.

Mechanically adjustable flexible lenses typically have a substantially wider range of tunability than the gradient index lenses. However, they require external actuation devices, such as micropumps, to operate. Integration of such actuation devices into optoelectronic packages involves substantial problems associated with their miniaturization and positioning. These become especially severe in the case where a two-dimensional array of tunable microlenses is required.

Attempts have also been made to use other technologies to produce tunable microlenses, such as liquid microlenses controlled through self-assembled monolayers. Some of these attempts are described in U.S. Pat. No. 6,014,259, issued Jan. 11, 2000, the entirety of which is hereby incorporated by reference herein. Microlenses utilizing self-assembled monolayers, however, also suffer from several problems, including severe limitations on material selection and strong hysteresis often leading to the failure of the microlens to return to an original shape after a tuning voltage is disconnected.

More recent attempts have involved developing liquid microlenses that permit lens position and focal length adjustments. Examples of such microlenses, which utilize electrowetting principles coupled with external electronic control systems to accomplish these position and focal length adjustments, are described in copending U.S. patent applications Ser. No. 09/884,605, filed Jun. 19, 2001, entitled "Tunable Liquid Microlens" and Ser. No. 09/951,637, filed Sep. 13, 2001, entitled "Tunable Liquid Microlens With Lubrication Assisted Electrowetting." The alignment and calibration of such microlenses is the subject of copending U.S. patent applications Ser. No. 10/135,973, filed Apr. 30, 2002, entitled "Method And Apparatus For Aligning A Photo-Tunable Microlens" and Ser. No. 10/139,124, filed May 3, 2002, entitled "Method And Apparatus For Calibrating A Tunable Microlens," respectively. The '605, '637, '973 and '124 applications are hereby incorporated by reference herein in their entirety.

SUMMARY OF THE INVENTION

We have recognized that none of the above-described microlenses, allow for changing the directional view of the lens without manual repositioning of the structure upon which the lens is disposed. Additionally, the field of view of prior microlenses is strictly limited by the size and shape of the microlens. Therefore, while the aforementioned applications provide exemplary electrowetting-based tunable liquid microlenses, we have recognized that there remains a need to provide a tunable liquid microlens that does not require manual repositioning of the structure underlying the lens to change the directional view and the field of view of the lens. In particular, in certain applications it may be advantageous to have a microlens that is able to achieve a new directional view and have an increased field of view without such manual repositioning.

Therefore, we have invented a microlens that uses a substrate having a non-zero radius of curvature. Illustratively, the directional view of the microlens is altered by passing a current over at least one of a plurality of electrodes and thereby causing a voltage differential between the at least one of a plurality of electrodes and a conducting droplet of liquid disposed on the substrate with a non-zero radius of curvature. As the droplet moves to a different point along the surface of the substrate having a non-zero radius of curvature, the directional view the microlens changes in a way such that light originating from the new directional view is more advantageously focused into an image on a detector. The field of view of the microlens, therefore, is only limited by the area over which the liquid droplet can move.

DETAILED DESCRIPTION OF THE INVENTION

Figure 1:
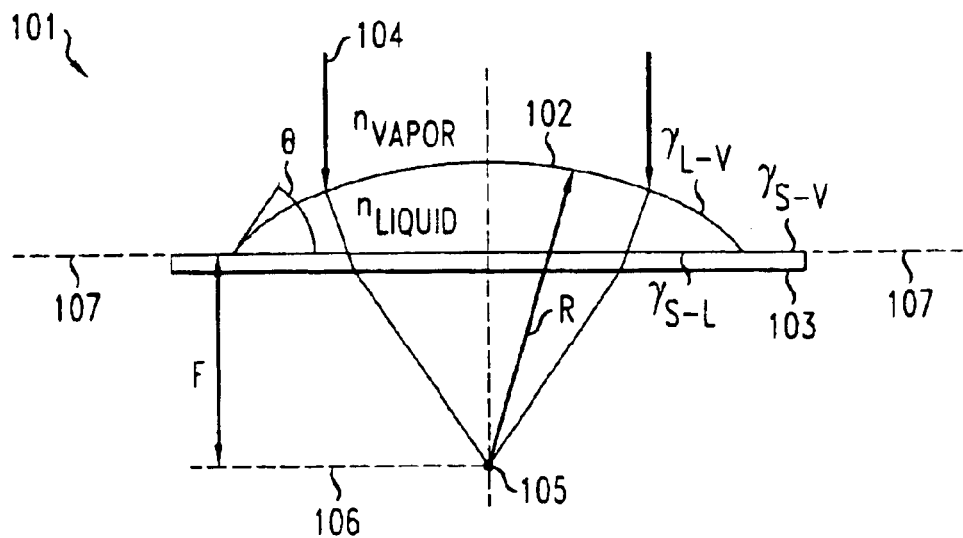
FIG. 1 shows a prior art microlens and its operational effect on a beam of light.

FIG. 1 shows a prior art embodiment of a liquid microlens 101 including a small droplet 102 of a transparent liquid, such as water, typically (but not necessarily) with a diameter from several micrometers to several millimeters. The droplet is disposed on a transparent substrate 103 which is typically hydrophobic or includes a hydrophobic coating. The droplet 102 and substrate 103 need only be transparent to light waves having a wavelength within a selected range. Light waves 104 pass through the liquid microlens focal point/focal spot 105 in a focal plane 106 that is a focal distance r from the contact plane 107 between the droplet 102 and the substrate 103.

The contact angle θ between the droplet and the substrate is determined by interfacial surface tensions (also known as Interfacial energy) "γ", generally measured in milli-Newtons per meter (mN/m). As used herein, $\gamma_{S-V}$ is the interfacial tension between the substrate 103 and the air, gas or other liquid that surrounds the substrate, $\gamma_{L-V}$ is the interfacial tension between the droplet 102 and the air, gas or other liquid that surrounds the droplet, and $\gamma_{S-L}$ is the interfacial tension between the substrate 103 and the droplet 102. The contact angle θ may be determined from equation (1):

$$\cos \theta = (\gamma_{S-V} - \gamma_{S-L})/\gamma_{L-V} \qquad \text{Equation (1)}$$

The radius "R" in meters of the surface curvature of the droplet is determined by the contact angle θ and the droplet volume in cubic meters ($m^3$) according to equation (2) as follows:

$$R^3 = 3*(\text{Volume})/[\pi*(1-\cos \theta)(2-\cos^2\theta - \cos \theta)] \qquad \text{Equation (2)}$$

The focal length in meters is a function of the radius and the refractive indices "n", where $n_{liquid}$ is the refractive index of the droplet and $n_{vapor}$ is the refractive index of the air, gas or other liquid that surrounds the droplet 102. The focal length f may be determined from Equation (3):

$$f = R/(n_{Liquid} - n_{vapor}) \qquad \text{Equation (3)}$$

The refractive index of the substrate 103 is not critical because of the parallel entry and exit planes of the light waves. The focal length of the microlens 101, therefore, is a function of the contact angle θ.

Figure 2:
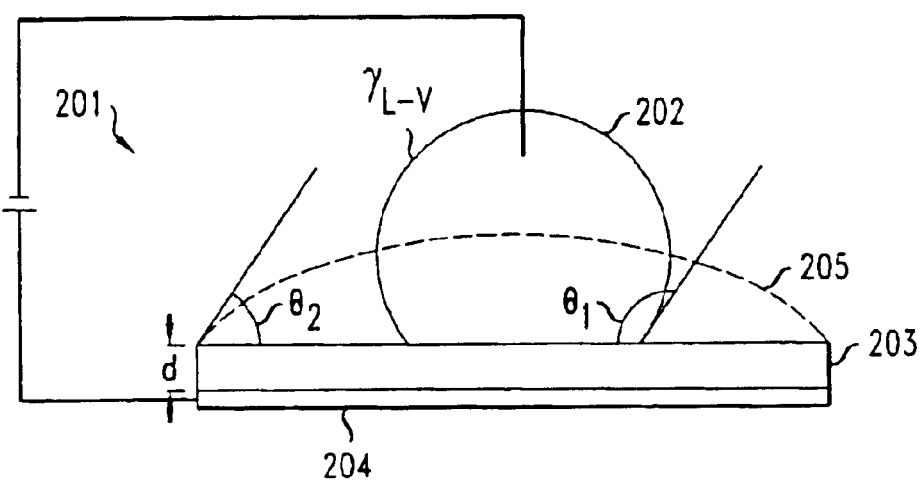
FIG. 2 shows a prior art microlens wherein a voltage differential between an electrode and a droplet of conducting liquid is used to adjust the focal length of the lens.

FIG. 2 shows a prior art microlens 201 whereby the phenomenon of electrowetting may be used to reversibly change the contact angle θ between a droplet 202 of a conducting liquid (which may or may not be transparent) and a dielectric insulating layer 203 having a thickness "d" and a dielectric constant $\in_r$. An electrode 204, such as metal electrode is positioned below the dielectric layer 203 and is insulated from the droplet 202 by that layer. The droplet 202 may be, for example, a water droplet, and the dielectric insulating layer 203 may be, for example, a Teflon/Parylene surface.

When no voltage difference is present between the droplet 202 and the electrode 204, the droplet 202 maintains its shape defined by the volume of the droplet and contact angle $\theta_1$, where $\theta_1$ is determined by the interfacial tensions γ as explained above. When a voltage V is applied to the electrode 204, the voltage difference between the electrode 204 and the droplet 202 causes the droplet to spread. The dashed line 205 illustrates that the droplet 202 spreads equally across the layer 203 from its central position relative to the electrode 204. Specifically, the contact angle θ decreases from $\theta_1$ to $\theta_2$ when the voltage is applied between the electrode 204 and the droplet 202. The voltage V necessary to achieve this spreading may range from several volts to several hundred volts. The amount of spreading, i.e., as determined by the difference between $\theta_1$ and $\theta_2$, is a function of the applied voltage V. The contact angle $\theta_2$ can be determined from equation (4):

$$\cos \theta(V) = \cos \theta(V=0) + V^2(\in_0 \in_r)/(2d\gamma_{L-V}) \qquad \text{Equation (4)}$$

where cos θ(V=0) is the contact angle between the insulating layer 203 and the droplet 202 when no voltage is applied between the droplet 202 and electrode 204; $\gamma_{L-V}$ is the droplet interfacial tension described above; $\in_r$ is the dielectric constant of the insulating layer 203; and $\in_0$ is $8.85 \times 10^{-12}$ FM—the permissivity of a vacuum.

Figure 3A:
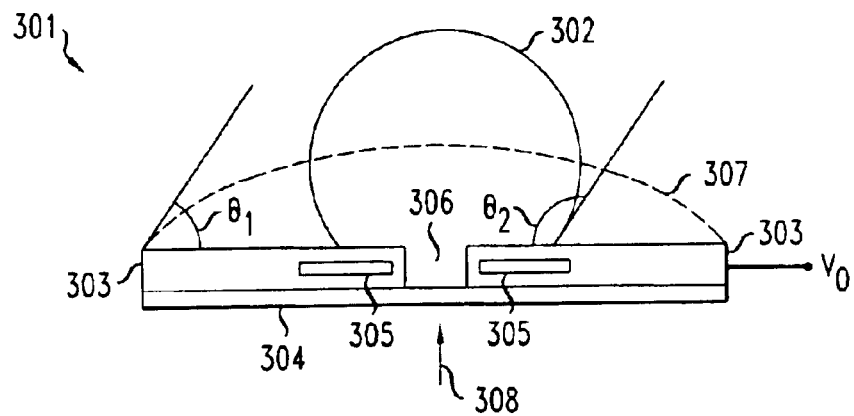
FIGS. 3A and 3B show a prior art microlens wherein the droplet of conducting liquid is electrically coupled to a substrate via a well.
Figure 3B:
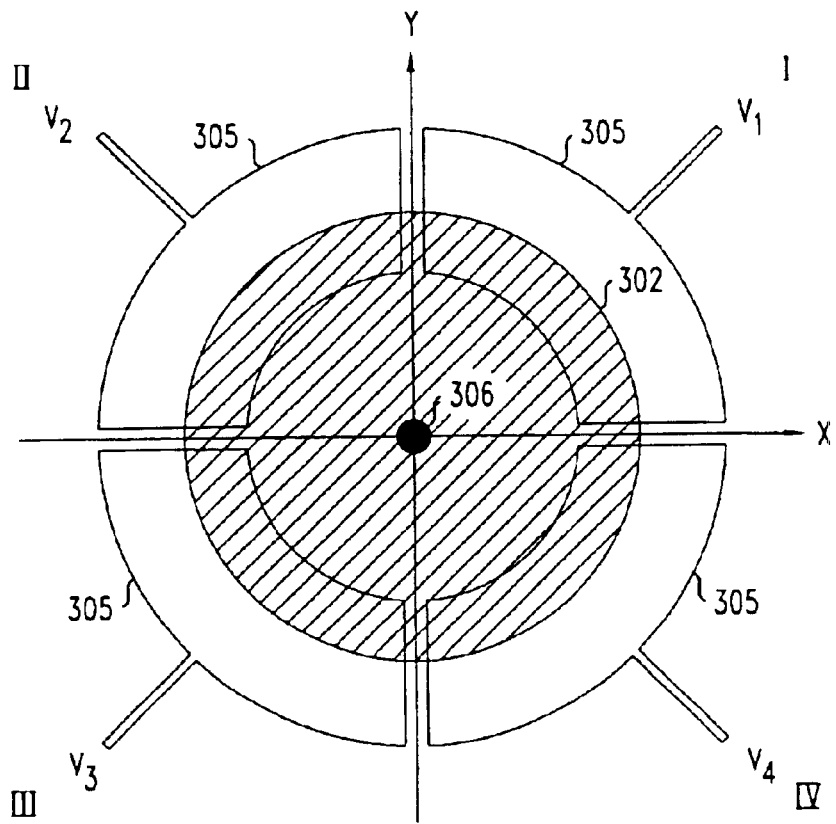

FIGS. 3A and 3B illustrate a prior art tunable liquid microlens 301 that is capable of varying both position and focal length. Referring to FIG. 3A, a tunable liquid microlens 301 includes a droplet 302 of a transparent conductive liquid disposed on a first surface of a transparent, dielectric insulating layer 303. The microlens 301 includes a plurality of electrodes 305 insulated from the droplet 302 by the insulating layer 303. A conducting transparent substrate 304 supports the electrodes 305 and the insulating layer 303 and is connected to the droplet 302 via a well 306 running through the dielectric insulating layer 303. Thus, when voltage $V_0$ is passed over the conducting transparent substrate 304, the droplet 302 also experiences voltage $V_0$.

FIG. 3B is a top plan view of an illustrative configuration for the electrodes 305. Each electrode is coupled to a respective voltage $V_1$ through $V_4$ and the droplet 302, which is centered initially relative to the electrodes, is coupled to a voltage $V_0$ via the well 306. When there is no voltage difference between the droplet 302 and any of the electrodes 305 (i.e., $V_1=V_2=V_3=V_4=V_0$), and the droplet 302 is centered relative to the electrodes and quadrants I thru IV, the droplet 302 assumes a shape as determined by contact angle $\theta_1$ and the volume of droplet 302 in accordance with equations (1)–(3) explained above. The position of the droplet 302 and the focal length of the microlens can be adjusted by selectively applying a voltage potential between the droplet 302 and the electrodes 305. If equal voltages are applied to all four electrodes (i.e., $V_1=V_2=V_3=V_4 \approx V_0$), then the droplet 302 spreads equally within quadrants I, II, III and IV (i.e., equally along lateral axes X and Y). Thus, the contact angle θ between the droplet 302 and insulating layer 303 decreases from $\theta_2$ to $\theta_1$ in FIG. 3A. The resulting shape of the droplet 302 is shown as the dashed line 307 in FIG.

3A. This new shape of the droplet 302 with contact angle $\theta_1$ increases the focal length of the microlens 301 from the focal length of the microlens with the initial contact angle $\theta_2$ (i.e., when $V_1=V_2=V_3=V_4=V_0$).

Figure 4:
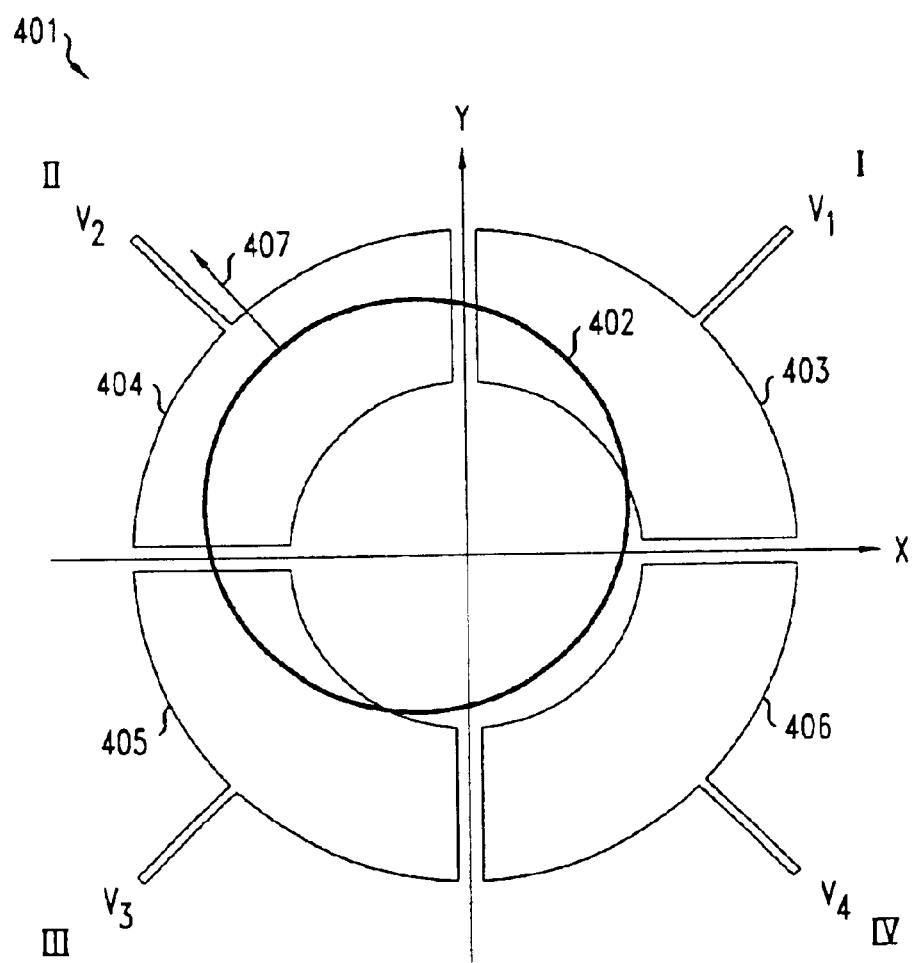
FIG. 4 shows the prior art microlens of FIGS. 3A and 3B wherein a voltage selectively applied to one or more electrodes results in a movement of the droplet away from its centered position relative to the electrodes.

FIG. 4 shows the prior art microlens of FIG. 3A and FIG. 3B wherein the lateral positioning of the droplet, 301 in FIGS. 3A and 3B, along the X and Y axes can also be changed relative to the initial location of the droplet by selectively applying voltages to one or more of the electrodes, 305 in FIGS. 3A and 3B. For example, referring to FIG. 4, by making $V_1=V_3=V_0$ and by making $V_2$ greater than $V_4$, the droplet 402 is attracted toward the higher voltage of the electrode 404 and thus moves in direction 407 toward quadrant 11. As discussed above, by adjusting the lateral position of the droplet 402, the lateral position of the focal spot of the microlens 401 in that microlens' focal plane is also adjusted. Thus, by selectively adjusting the voltage applied to one or more of the electrodes 403, 404, 405 and 406 relative to the droplet 402 in different combinations, the focal length and the lateral position of the microlens 401 can be selectively adjusted.

While the prior art electrowetting based microlens embodiments described above are useful in certain applications, they are also limited in certain aspects of their usefulness. For example, all of these prior art electrowetting microlenses are limited to a single directional view, and as such are only capable of receiving and precisely focusing light arriving at the microlens from a single direction, such as direction 308 in FIG. 3A. Thus, while it may be desirable to receive and focus light emanating from a different directional view, this is impossible with prior art lenses without physical repositioning of the microlens. Thus, there remains a need to provide a tunable liquid microlens that is capable of altering its directional view without requiring physical repositioning of the lens support structure. In particular, in certain applications it may be advantageous to have a microlens that is self-tunable such that as the liquid droplet of the microlens moves, its directional view changes.

Figure 5:
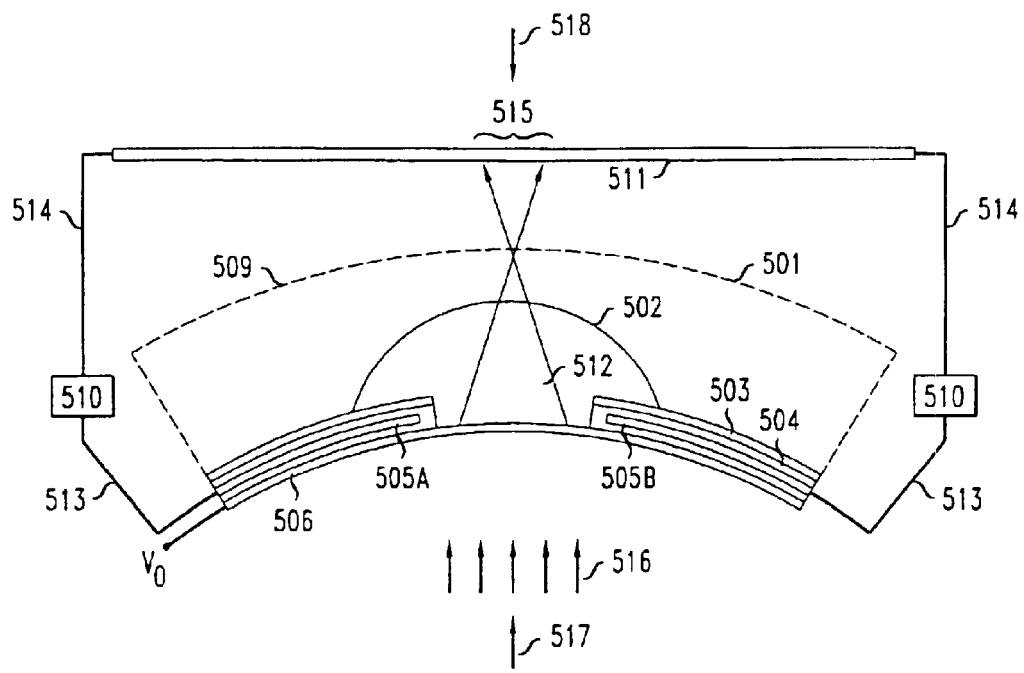
FIG. 5 shows a microlens in accordance with the present invention wherein the droplet is disposed on a substrate having a non-zero radius of curvature.

FIG. 5 shows a first embodiment of the present invention wherein a self-tunable liquid microlens 501 includes a droplet 502 of a transparent conductive liquid disposed on a first surface of a substrate 512 with a non-zero radius of curvature. The illustrative substrate, shown in FIG. 5, includes a hydrophobic layer 503 upon which the liquid droplet 502 is disposed. The hydrophobic layer 503 is disposed, in turn, on a dielectric insulating layer 504. Illustrative dielectric insulating materials include the aforementioned Teflon/Parylene surface. Alternatively, the dielectric insulating layer 504 could be made of a hydrophobic material, thus eliminating the need for a separate hydrophobic layer 503. The droplet 502 may be, illustratively, enclosed inside an enclosure liquid 509, such as, illustratively, a silicone oil. This may be advantageous because it makes the microlens less susceptible to external sources of vibration. By choosing an appropriate liquid with an appropriate index of refraction, optical loss through the enclosure liquid can be minimized.

The microlens 501 includes a plurality of electrodes 505 each of which is separated from the droplet 502 by the dielectric insulating layer 504. A conducting transparent substrate 506, such as a substrate made from transparent glass, supports the electrodes 505 and the dielectric layer 504, and is connected to the droplet 502 via a well 512 running through the hydrophobic layer 503 and the dielectric insulating layer 504. A voltage $V_0$ is applied to the conducting transparent substrate 506 and, hence, the droplet 502. The droplet 502 may advantageously be enclosed in an enclosure liquid or gas 509.

When a light beam 516 of a selected wavelength, such as that generated by a laser or reflected toward the microlens by an object in the environment, is incident upon the microlens it passes, illustratively, through conducting transparent substrate 506 and is focused by the liquid droplet 502 onto detector 511. One skilled in the art will recognize that, instead of light beam 516 traveling in direction 517, in certain applications (e.g., simulations of a human eye) the light beam may be traveling in direction 518 and the CCD will be disposed on the opposite side of the microlens 501. Thus, when the light is traveling in direction 518, the light will first pass through the liquid droplet 502 and then through the transparent substrate 506 before being incident upon the CCD.

Detector 511 is, illustratively, a charge-coupled device (CCD). When the light beam 516 originates from direction 517, and as such is aligned with a centered liquid droplet, a focused image 515 formed is formed on CCD 511. CCD 511 is connected to controllers 510 via leads 514. Controllers 510 are, in turn, connected to the electrodes of the microlens, such as electrodes 505A and 505B, via leads 513. Controllers 510 function to selectively apply voltages to the electrodes. As discussed previously, the desired focus of the image 515 on detector 511 can be maintained by controllers 510 by varying the voltage across individual electrodes to either adjust the focal length of the microlens or, alternatively, the lateral position of the droplet of the microlens. However, unlike prior microlenses, since the substrate in FIG. 5 is curved, adjusting the lateral position of the droplet 502 also permits the focusing of a light beam that originates from a different direction.

Figure 6:
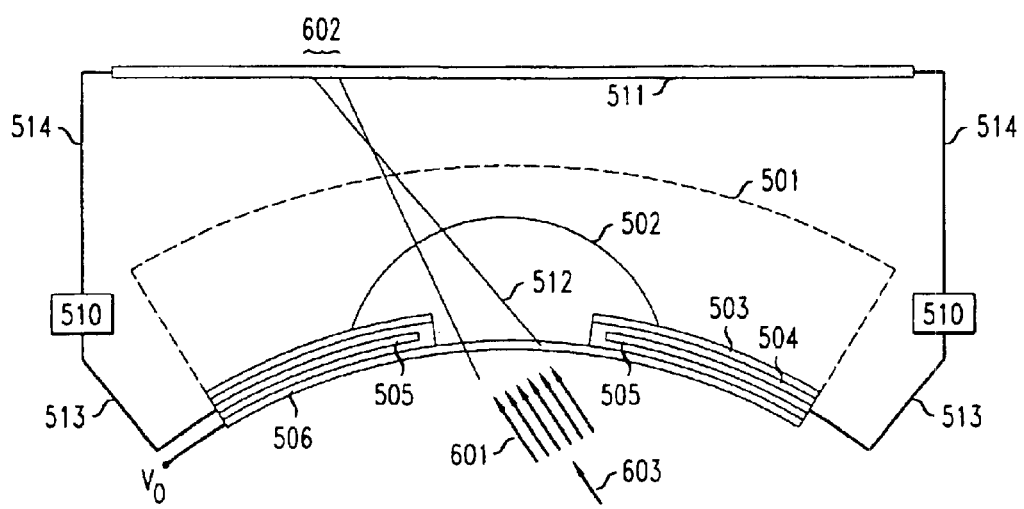
FIG. 6 shows the microlens of FIG. 5, wherein light originating from a non-aligned direction is focused onto a detector.

FIG. 6 shows the microlens of FIG. 5 wherein light beam 601 originates from direction 603, which is different from direction 517 in FIG. 5. As before, the light passes through the substrate 506 and the droplet 502 and is incident upon detector 511. However, unlike image 515 in FIG. 5, since the light beam is not aligned with the droplet 502 the resulting image 602 is not desirably focused onto the detector 511. Specifically, the image may be blurry and of an undesirable size relative to a desirably focused image.

Figure 7:
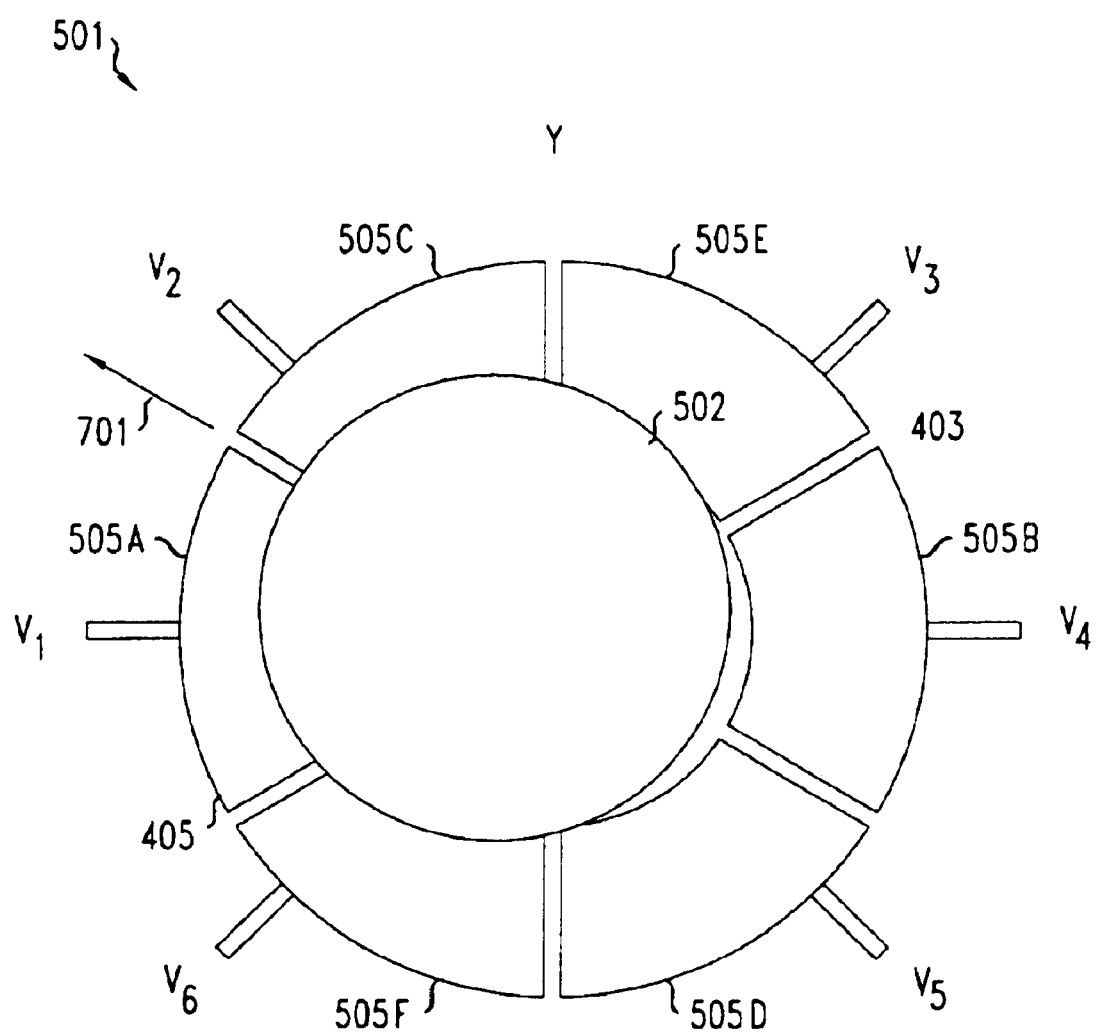
FIG. 7 shows a top plan view of the microlens of FIG. 6 wherein a voltage selectively applied to one or more electrodes results in a movement of the droplet away from its centered position on the substrate relative to the electrodes.

FIG. 7 shows a top view of the microlens of FIGS. 5 and 6. FIG. 7 illustrates how originating from a different direction than the aligned direction, such as direction 603, may be desirably focused onto detector 511. Referring to FIG. 7, each electrode 505A–505F is coupled to a respective voltage $V_1$ through $V_6$. Droplet 502, which is centered initially relative to the electrodes 505A–505F, is coupled to a voltage $V_0$ via the well 512 in FIG. 5. When there is no voltage difference between the droplet 502 and any of the electrodes (i.e., $V_1=V_2=V_3=V_4=V_5=V_6=V_0$) the droplet 502 is centered relative to the electrodes, as shown in FIGS. 5 and 6. Additionally, the droplet 502 assumes a shape as determined by the contact angle e in FIG. 3 and the volume in accordance with equations (1)–(3) explained above. As described above, the position of the droplet 502 and the focal length of the microlens 501 can be adjusted by controllers 510 by selectively applying a voltage difference between the droplet 502 and selected individual electrodes 505A–505F. As applied to FIG. 7, therefore, by increasing the voltage such that $V_1=V_2>V_0$ where $V_3=V_4=V_5=V_6=V_0$, the droplet 502 will move in direction 701.

Figure 8:
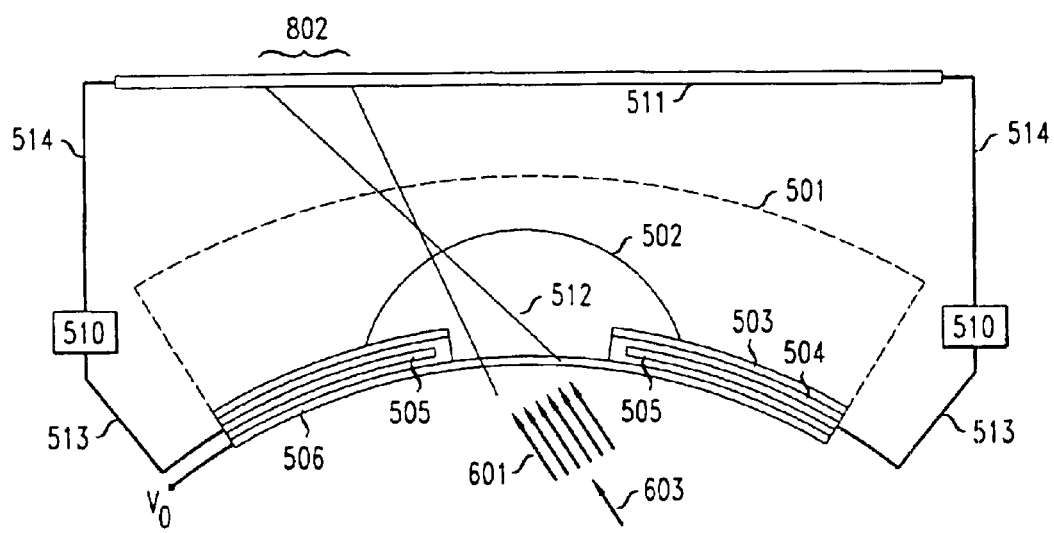
FIG. 8 shows a cross sectional view of the microlens of FIG. 7 wherein the droplet in its new position relative to the electrodes is now able to more desirably focus the incoming light beam.

FIG. 8 represents a cross sectional view of the microlens of FIG. 7. FIG. 8 shows how, by moving the droplet 502 in direction 701, the droplet becomes more aligned with incoming light beam 601. Due to this better alignment condition, the resulting image 802 on detector 511 is desirably focused and is of a desired size.

One potential use of the invention herein described is in the simulation of human vision in a variety of fields. Referring to FIG. 5, the light entering the microlens from direction 517 would be the equivalent of light reflected from an object that a human eye is looking at—the image 515 is desirably focused and is of a desirable size. Referring to FIG. 6, light entering the microlens from direction 603 would be the equivalent of light forming the "peripheral vision" of the human eye—the light is focused onto the detector 511 (the equivalent of the retina in a human eye), but is not desirably focused nor is a precise image formed of the light entering from this direction. If a characteristic of image 602 changes, then it may be desirable to change the directional view of the microlens to achieve a more precise, focused image. For example, if movement is detected in the distant object that forms the image 602, then it may be desirable to "look" at that distant object. FIG. 8 shows that, as in the case of the human eye, by repositioning the liquid droplet as described above, the directional view of the microlens is changed and the distant object Is more desirably focused as image 802 on the detector 511.

Figure 9:
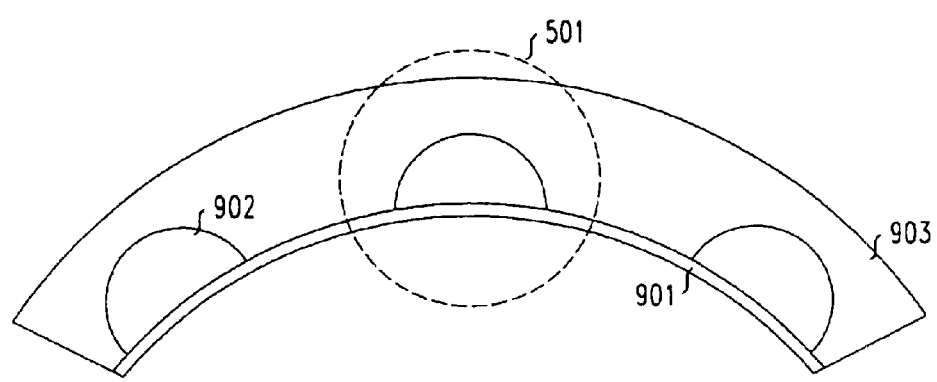
FIG. 9 shows how a microlens in accordance with the principles of the present invention can be used in an array of lenses.

FIG. 9 shows how multiple microlenses, such as microlenses 501, 902 and 903 may be used together along a substrate with a non-zero radius of curvature to further enhance the above-described principles of the present invention. Specifically, multiple lenses allow for a wider field of view which may be advantageous in many different uses.

The foregoing merely illustrates the principles of the invention. It will thus be appreciated that those skilled in the art will be able to devise various arrangements which, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A tunable liquid microlens comprising:
   a substrate with a surface having a non-zero radius of curvature;
   a droplet of conducting liquid disposed on said substrate; and
   means for producing a voltage differential between said droplet of conducting liquid and said substrate.

2. The tunable liquid microlens of claim 1 wherein said means for producing a voltage differential comprises at least a first electrode.

3. The tunable liquid microlens of claim 2 wherein said at least a first electrode is a plurality of electrodes.

4. The tunable liquid microlens of claim 1 wherein said substrate comprises a conducting material that is transparent to at least one wavelength of light for use in an optical system.

5. The tunable liquid microlens of claim 1 wherein said droplet of conducting liquid is enclosed within an enclosure liquid.

6. The tunable liquid microlens of claim 5 wherein said enclosure liquid is a silicone oil.

7. The tunable liquid microlens of claim 1 wherein said voltage differential is operative to displace the droplet of conducting liquid along the surface of said substrate.

8. The tunable liquid microlens of claim 2 further comprising a dielectric insulating layer that insulates said at least a first electrode from said droplet.

9. A method for changing a directional view of a tunable liquid microlens, said microlens comprising a droplet of a conducting liquid initially disposed in a first position on a surface of a substrate, said method comprising creating a voltage differential between said droplet and said substrate, thereby displacing said droplet from said first position to a second position on said surface,
   wherein said surface has a non-zero radius of curvature.

10. The method of claim 9 wherein said voltage differential between said droplet and said substrate is created by passing a voltage over at least a first electrode.

11. The method of claim 10 wherein said at least a first electrode is a plurality of electrodes.

12. The method of claim 9 wherein said substrate comprises a conducting material that is transparent to at least one wavelength of light for use in an optical system.

13. The method of claim 9 further comprising the step of enclosing said droplet of conducting liquid within an enclosure liquid.

14. The method of claim 13 wherein said enclosure liquid is a silicone oil.

15. The method of claim 10 further comprising insulating said at least a first electrode from said substrate by a dielectric insulating layer.

* * * * *